(12) United States Patent
Shirokov

(10) Patent No.: US 11,757,322 B2
(45) Date of Patent: Sep. 12, 2023

(54) STATOR WINDING ARRANGEMENT

(71) Applicant: Rolls-Royce plc, London (GB)

(72) Inventor: Vladimir A. Shirokov, Derby (GB)

(73) Assignee: ROLLS-ROYCE plc, London (GB)

( * ) Notice: Subject to any disclaimer, the term of this patent is extended or adjusted under 35 U.S.C. 154(b) by 336 days.

(21) Appl. No.: 17/100,481

(22) Filed: Nov. 20, 2020

(65) Prior Publication Data

US 2021/0167654 A1   Jun. 3, 2021

(30) Foreign Application Priority Data

Nov. 28, 2019 (GB) ...................................... 1917313

(51) Int. Cl.
*H02K 3/00* (2006.01)
*H02K 3/28* (2006.01)
*B64D 27/24* (2006.01)

(52) U.S. Cl.
CPC ............... *H02K 3/28* (2013.01); *B64D 27/24* (2013.01)

(58) Field of Classification Search
CPC .. H02K 3/28; H02K 3/02; H02K 3/04; H02K 3/12; H02K 3/46; H02K 3/48; H02K 3/50; H02K 3/505; H02K 3/522; H02K 310/208; H02K 310/198
See application file for complete search history.

(56) References Cited

U.S. PATENT DOCUMENTS

| | | | |
|---|---|---|---|
| 2002/0057031 A1* | 5/2002 | Ueda | H02K 3/18 310/201 |
| 2005/0264123 A1* | 12/2005 | Maeda | H02K 3/522 310/180 |
| 2009/0121575 A1* | 5/2009 | Wolf | H02K 3/28 310/263 |
| 2016/0156238 A1 | 6/2016 | Tsuiki et al. | |

(Continued)

FOREIGN PATENT DOCUMENTS

| | | |
|---|---|---|
| CN | 207766054 U | 8/2018 |
| EP | 3 276 798 A1 | 1/2018 |

(Continued)

OTHER PUBLICATIONS

Apr. 16, 2021 extended Search Report issued in European Patent Application No. 20206402.8.

*Primary Examiner* — Quyen P Leung
*Assistant Examiner* — Elrasheed E. B. Hamdan
(74) *Attorney, Agent, or Firm* — Oliff PLC

(57) ABSTRACT

The disclosure relates to winding arrangements for electrical machine stators. Example embodiments include a coil for a tooth element of an electrical machine stator, the coil formed from a plurality of hairpin wires having pairs of legs passing through first and second slots on opposing radial faces of the tooth element, the coil having n full turns passing around the tooth element, the first and second slots each having 2n+2 slot positions having a depth d' for accommodating a single hairpin wire, the slots each having a first slot position at a first common end and a $2n+2^{th}$ slot position at a second (Continued)

opposing end, the coil having first and second terminal connections connected to hairpin wires extending through the first and second slots at respective first and second slot positions.

9 Claims, 6 Drawing Sheets

(56) References Cited

U.S. PATENT DOCUMENTS

2018/0342918 A1 11/2018 Hino et al.
2020/0227988 A1* 7/2020 Zhu .......................... B64C 11/46

FOREIGN PATENT DOCUMENTS

| JP | 2012-125043 A | 6/2012 |
| JP | 2015231277 A | 2/2015 |
| WO | 2015/011542 A2 | 1/2015 |

* cited by examiner

STATOR WINDING ARRANGEMENT

CROSS-REFERENCE TO RELATED APPLICATIONS

This specification is based upon and claims the benefit of priority from United Kingdom Patent Application Number 1917313.7, filed on 28 Nov. 2019, the entire contents of which are incorporated herein by reference.

FIELD OF THE DISCLOSURE

The present disclosure concerns winding arrangements for electrical machine stators.

BACKGROUND

The stator of an electrical machine, which may operate as a motor and/or generator, comprises a ferritic core with a plurality of radially aligned teeth, the teeth surrounded by windings of electrically conductive wire to form the electrical phases of the machine.

A known manufacturing technique for electrical machine windings uses components commonly known as "hairpin windings". In this, the coils around each stator tooth are formed from multiple hairpin-like metal bars, which are typically copper-based. Each hairpin is inserted through adjacent slots either side of a tooth, and the free ends are bent and electrically connected to form continuous windings.

The coils on a stator form the (usually three) phases of the electrical machine, which may be done by connecting the coils to each other in series or in parallel. Forming interconnections between coils can result in a significant amount of additional interconnecting wiring, which consumes space, adds weight and adds to electrical losses, particularly if electrical connections are required from inner radial positions to outer radial positions.

SUMMARY OF THE DISCLOSURE

According to a first aspect there is provided a coil for a tooth element of an electrical machine stator, the coil formed from a plurality of hairpin wires having pairs of legs passing through first and second slots on opposing radial faces of the tooth element, the coil having n full turns passing around the tooth element, the first and second slots each having $2n+2$ slot positions having a depth for accommodating a single hairpin wire, the slots each having a first slot position at a first common end and a $2n+2^{th}$ slot position at a second opposing end, the coil having first and second terminal connections connected to hairpin wires extending through the first and second slots at respective first and second slot positions.

The winding arrangement provided, formed using hairpin wires, allows for improvements relating to interconnecting coils such as reduced consumed volume, weight and losses due to input and output terminals of the coil being on a common end of a tooth.

The coil may be formed from $n+1$ hairpin wires, with n electrical connections made between legs of adjacent pairs of hairpins across the first axial face of the stator.

In typical examples, half of the slot positions in each slot are filled with a wire of the coil. The other half of the slot positions are thereby available to be filled with wires from adjacent coils.

The coil may be configured for a radial or axial flux arrangement for an electrical machine. For radial flux arrangements, the first slot position of each slot may be at a first common radial end and the $2n+2^{th}$ slot position may be at a second opposing radial end. The first and second radial ends of each slot may be at respective outer and inner radial ends of each slot. In alternative radial flux arrangement examples the arrangement may be reversed. For axial flux arrangements, the first slot position of each slot may be at a first common axial end and the $2n+2^{th}$ slot position at a second opposing axial end.

In accordance with a second aspect there is provided a stator of an electrical machine, comprising a plurality of tooth elements separated by a plurality of slots, each tooth element surrounded by a respective coil according to the first aspect.

Each slot position may have a width that is suitable for accommodating a single hairpin wire. In some arrangements the width of each slot position may be suitable for accommodating more than one hairpin wire, for example two wires side by side. Being able to accommodate two wires may allow for two concentric coils to be provided around a common tooth element.

Alternatively expressed, the second aspect may be defined as a stator of an electrical machine, the stator comprising a plurality of tooth elements separated by a plurality of slots, each tooth element surrounded by a respective coil, each coil formed from a plurality of hairpin wires having pairs of legs passing through first and second slots on opposing radial faces of the tooth element, the coil having n full turns passing around the tooth element, the first and second slots each having $2n+2$ slot positions having a depth for accommodating a single hairpin wire, the slots each having a first slot position at a first common end and a $2n+2^{th}$ slot position at a second opposing end, the coil having first and second terminal connections connected to hairpin wires extending through the first and second slots at respective first and second slot positions.

The coils around alternate tooth elements of the stator may be connected in series.

Each tooth element of the stator may comprise a plurality of teeth, for example up to three teeth for each tooth element.

In accordance with a third aspect there is provided an electrical machine comprising a rotor and a stator according to the second aspect.

The skilled person will appreciate that, except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION

Figure 1:
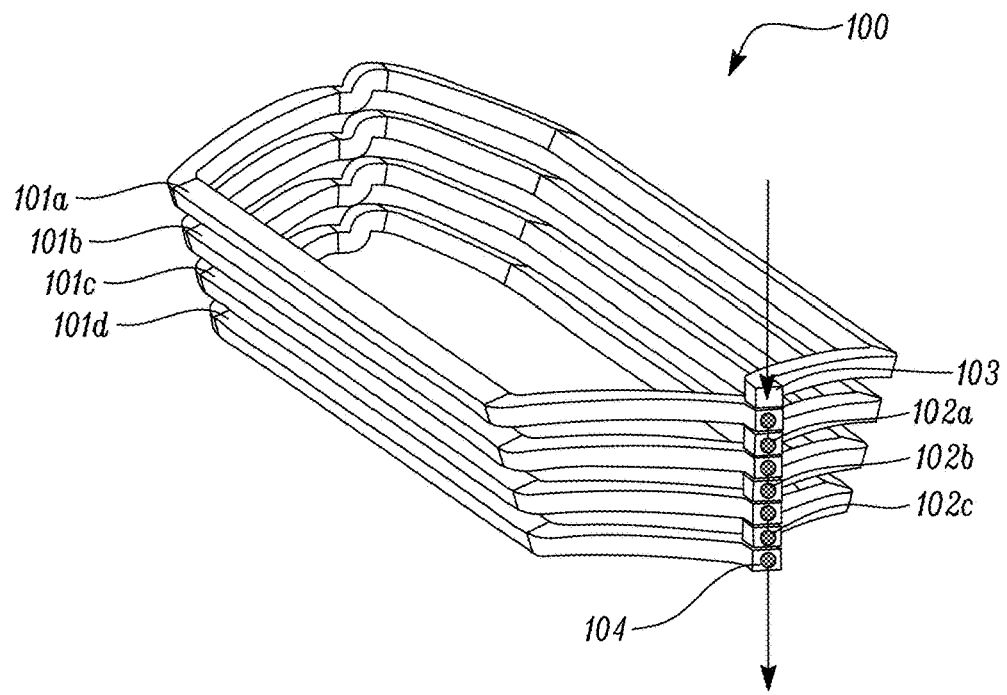
FIG. 1 is a schematic perspective view of an example helically wound coil for a stator tooth of an electrical machine.

Stator coils formed using hairpin windings are generally either in the form of helical or wave form windings. Both forms of windings result in the start and end of each coil being at opposing ends of the slots between adjacent teeth, one being positioned at the top of a slot and the other at the bottom. An example single helically wound coil 100 is illustrated in FIG. 1. The coil 100 is formed from four hairpin sections 101a-d, the sections being bent and electrically connected, for example by welding or braising, to provide connections 102a-c to form a continuous helix around a tooth (not shown) from a first connection 103 to a second connection 104. In such an arrangement, each section 101a-d is similar in form, with a single step radially inwards being provided by the addition of each subsequent section. This arrangement requires interconnections to be provided between the top and bottom of adjacent slots. Space at the bottom of each slot is typically more restricted due to the reduced radius, and may not be suitable for bus bars, leaving little room for additional interconnections.

For wave form windings, a pattern may be required that results in the correct amount of turns, coils and parallel paths only by requiring terminals far away from each other across the stator radius, requiring lengthy interconnections.

Figure 2:
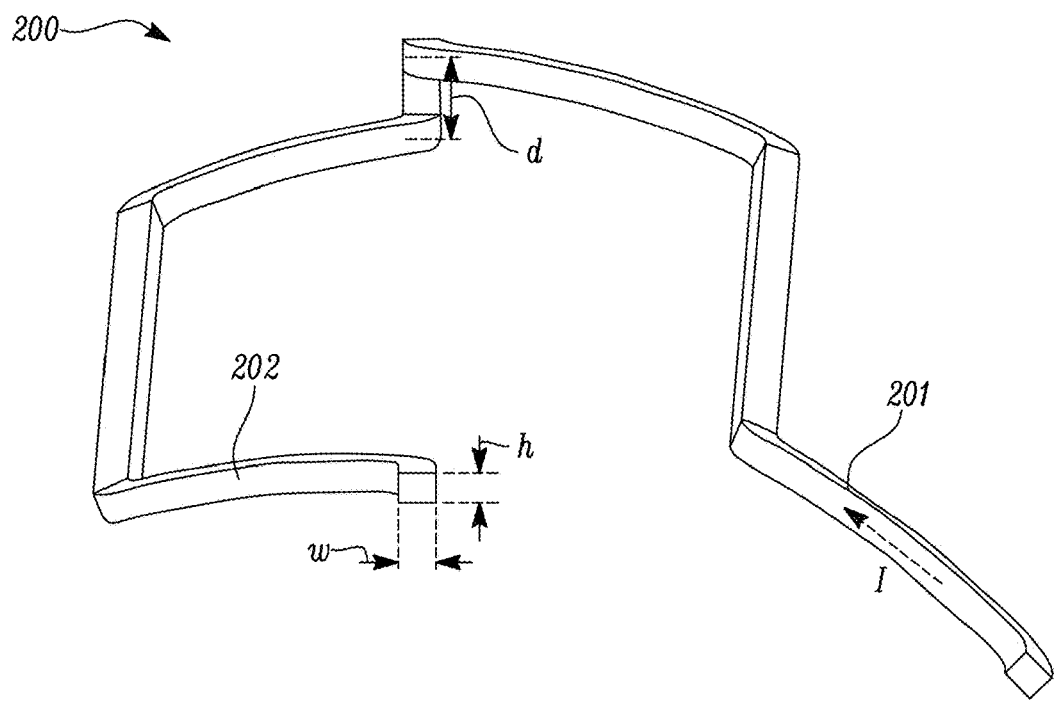
FIG. 2 is a schematic perspective view of an example portion of a coil for a stator tooth of an electrical machine.

FIG. 2 illustrates an example of a single hairpin 200 of a coil for an electrical machine. The hairpin 200 is formed from a wire having a cross-sectional width w, a cross-sectional height h and a radial drop distance d. The view in FIG. 2 shows the hairpin 200 after a bending operation following insertion through slots either side of one or more teeth of a stator, with end sections 201, 202 bent through around 90 degrees.

Figure 3:
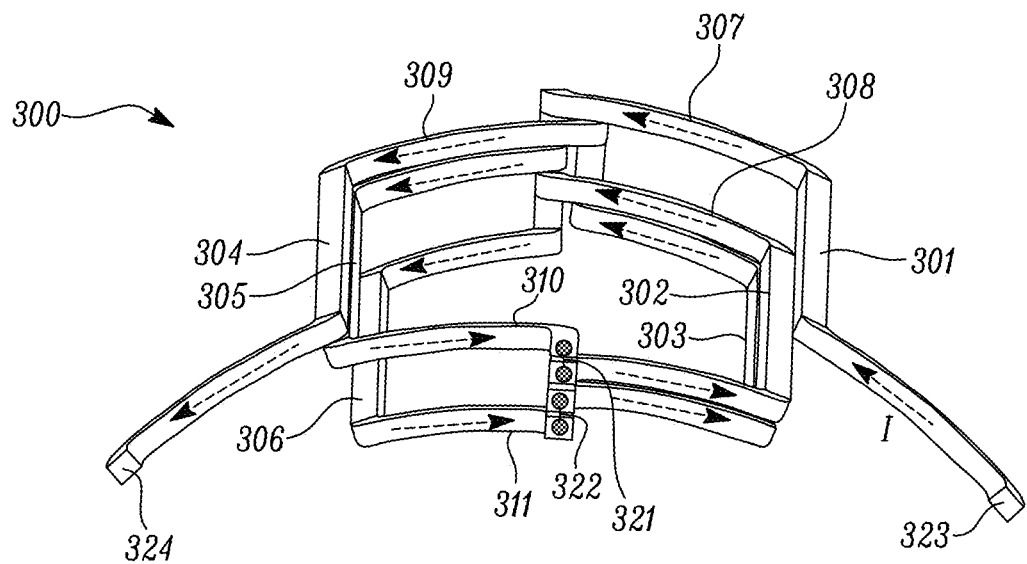
FIG. 3 is a schematic perspective view of an example winding arrangement of a coil.

A current I passes along the wire 200 in the direction shown. Wires of this form can be used to construct a helically wound coil, an example of which is illustrated in FIG. 3. The coil 300 is formed in this example from three hairpins having pairs of legs that are bent and electrically connected together with electrical connections 321, 322. An electrical current I passes from a first terminal connection 323 to a second terminal connection 324, and in this example passes fully twice around one or more teeth (not shown) of an electrical machine stator. In the completed coil, a full three turns are provided by the addition of a further section passing across the front axial face of the coil between the first and second terminal connections 321, 322 to connect adjacent coils on either side of the coil 300, as described in more detail below.

Figure 4:
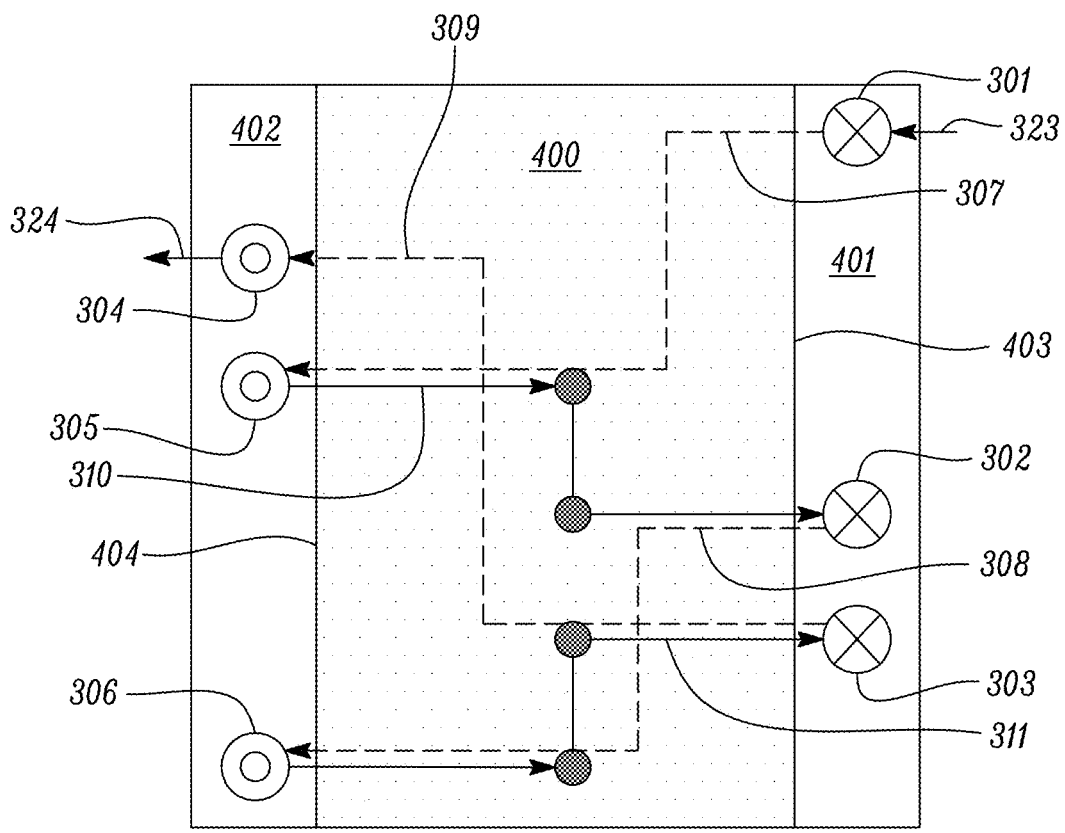
FIG. 4 is a schematic side view of the winding arrangement of FIG. 3.

Passage of the current through the coil 300 is illustrated in FIG. 3 and also schematically in FIG. 4, which shows a simplified schematic view of the coil around a stator tooth element 400 of an electrical machine from an axial face of the stator. First, second and third portions 301, 302, 303 of the coil extend through a first slot 401 adjacent a first radial face 403 of the tooth element 400, while fourth, fifth and sixth portions 304, 305, 306 extend through a second slot 402 adjacent an opposing radial face 404 of the tooth element 400. The direction of current is indicated as travelling into the page for the first, second and third portions 301, 302, 303, and out of the page for the fourth, fifth and sixth portions 304, 305, 306. The first terminal connection 323 is connected to the first portion 301, while the second terminal connection 324 is connected to the fourth portion 304.

The first, second and third portions 301, 302, 303 are arranged sequentially from outer to inner radial positions of the first slot 401. Similarly, the fourth, fifth and sixth portions 304, 305, 306 are arranged sequentially from outer to inner radial positions of the second slot 402. Due to this arrangement, the first and second terminal connections 323, 324 are both provided at an outer radial position, enabling easier and shorter connections to adjacent coils.

The first to sixth portions 301-306 of the coil 300 are connected by further portions 307-311, which may be termed seventh, eighth, ninth, tenth and eleventh portions respectively. The seventh, eighth and ninth portions 307, 308, 309 extend along the back axial face of the tooth in the view in FIG. 3, and are indicated by dotted lines in FIG. 4. The tenth and eleventh portions 310, 311 extend along the front face of the tooth in the view in FIG. 3, and are indicated by solid lines in FIG. 4.

The seventh portion 307 connects the first portion 301 to the fifth portion 305. The eighth portion 308 connects the third portion 303 to the fourth portion 304. The ninth portion 309 connects the second portion 302 to the sixth portion 306. The tenth portion 310 connects the fifth portion 305 to the second portion 302. The eleventh portion 311 connects the sixth portion 306 to the third portion 303.

Current flows along the coil 300 in the same sense around the tooth, which in the example shown is anti-clockwise from a view above the tooth 400. Current flows in an inward radial direction along the seventh, tenth and eighth portions, and flows in an outward radial direction along the eleventh and ninth portions.

In the example shown in FIGS. 3 and 4 the coil 300 has two full turns, but the concept can be extended to a coil having n full turns, where one full turn constitutes a complete circuit around a tooth element. FIGS. 5a to 5e illustrate coils 501-505 having respectively one, two, three, four and five full turns, using a similar symbolic layout as in FIG. 4. The coils 501-505 each extend through first and second slots 521, 522 on opposing radial faces of a tooth element 511. Each slot 521, 522 accommodates 2n+2 wires, in the form of hairpin portions extending through slots 521, 522. Each of the coils 501-505 is formed from a total of n+1 hairpin wires, and requires n electrical connections to be made between the legs of adjacent pairs of hairpins.

Figure 5A:
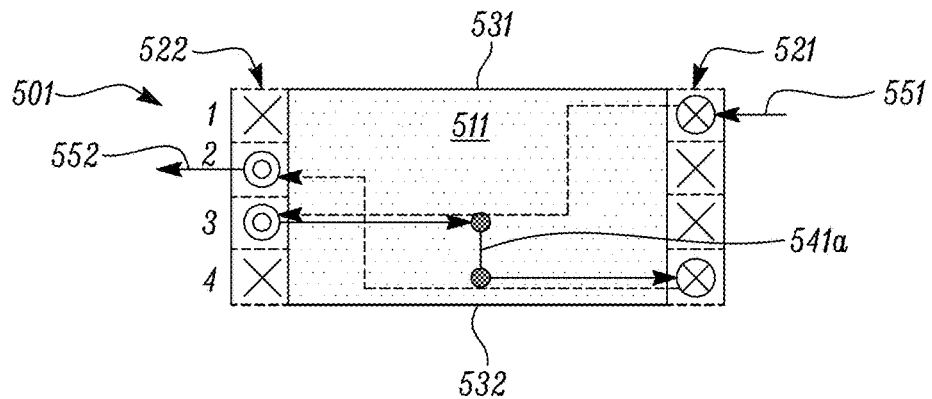
FIG. 5a is a schematic side view of an example winding arrangement of a coil with one full turn.

Each slot 521, 522 may be considered divided into 2n+2 slot positions, each slot position having a depth d' (FIG. 5c) that is capable of accommodating a single wire dimensioned for the slot, the depth of each slot position being measured in the radial direction. Counting from a first radial end 531 of the tooth 511 (which may be the outer radial end) to a second opposing radial end 532 of the tooth 511 (which may be inner radial end), these radial positions in each slot 521, 522 may be numbered from 1 to 2n+2. In FIG. 5a the slot positions number from 1 to 4, and in FIG. 5e the slot positions number from 1 to 12. For a single coil, any given slot position is either filled or not filled with a corresponding wire. In each case, half of the total slot positions are filled.

The table below summarises the number of full turns for each coil and the corresponding number of slot positions. The table also indicates how many of these slot positions are filled with wires from the coil and the sequence of filled slot positions in alternate slots. The sequence of slot positions starts from the slot position connected to the first terminal connection 551 through to the slot position connected to the second terminal connection 552, and alternates between a position in the first slot 521 and the second slot 522.

Each slot 521, 522 also has a width w' (FIG. 5c), measured in the circumferential direction. In the examples shown in FIGS. 5a-5e the width is dimensioned to accommodate a single hairpin wire. In some alternative arrangements the width may be capable of accommodating more than one hairpin wire side by side in a single slot position. This may for example allow for two coils to be provided around a common tooth element.

TABLE 1

Summary of parameters for coils having from 1 to 5 and n full turns.

| Number of full turns | Number of hairpins | Number of slot positions | Number of filled slot positions | Slot position sequence |
|---|---|---|---|---|
| 1 | 2 | 4 | 2 | 1, 3, 4, 2 |
| 2 | 3 | 6 | 3 | 1, 3, 4, 6, 5, 2 |
| 3 | 4 | 8 | 4 | 1, 3, 4, 7, 8, 6, 5, 2 |
| 4 | 5 | 10 | 5 | 1, 3, 4, 7, 8, 10, 9, 6, 5, 2 |
| 5 | 6 | 12 | 6 | 1, 3, 4, 7, 8, 11, 12, 10, 9, 6, 5, 2 |
| n | n + 1 | 2n + 2 | n | 1, 3, 4, [ . . . ], 2 |

Wire connections across the first (or front) axial face of the stator are indicated as solid lines, while wire connections across the second (or rear) axial face of the stator are indicated as dotted lines. The dotted lines represent the top loop portion of each hairpin, and the connections 541a-e represent connections between legs of adjacent hairpins that have been bent inwards and joined, for example by welding or braising. The direction of current is indicated by arrows on each connection. A cross in a circle within a filled slot indicates current travelling into the page, while a circle in a circle within a filled slot indicates current travelling out of the page. The same principle will apply with the current reversed. Empty slots are indicated by crosses.

The number of filled slot positions is the same for the first and second slots because this allows adjacent coils to be interleaved so that all of the slot positions are filled with wires when a full set of coils is assembled, as shown further in FIG. 6, described below. It can be seen in each case for the coils in FIGS. 5a to 5e that, for any given wire in a slot, there is a free slot position in the other slot. For any coil therefore, any given slot position is filled in either the first or second slots, but never in both. A consequence of this is that half of all slot positions in each slot are filled or empty.

In each case the number n of full turns provided by the coil equals the number of connections made across a first axial (or front) face of the stator across the tooth (or teeth) 511 around which the coil is applied. The first of these connections 541a is always made between the third slot position in the second slot 522 and the fourth slot position in the first slot 521. Any subsequent connections across the first axial face of the tooth 511 are made between immediately adjacent positions on opposing slots, i.e. between positions 5 and 6, 7 and 8, 9 and 10 and 11 and 12. The direction of current through each of these connections alternates along the radial direction. In the FIG. 5e example with five full turns, the current travels down the tooth from position 3 to position 4, from position 7 to position 8 and from position 11 to position 12, and travels back up the tooth from position 10 to position 9, and from position 6 to position 5.

For each coil 501-505, first and second terminal connections 551, 552 are made with wire portions extending through the first and second slots 521, 522 at respective first and second slot positions. Typically these slot positions will be the first and second radially outermost slot positions, although in alternative arrangements the terminal connections 551, 552 may be arranged to be at the first and second innermost slot positions.

Figure 6:
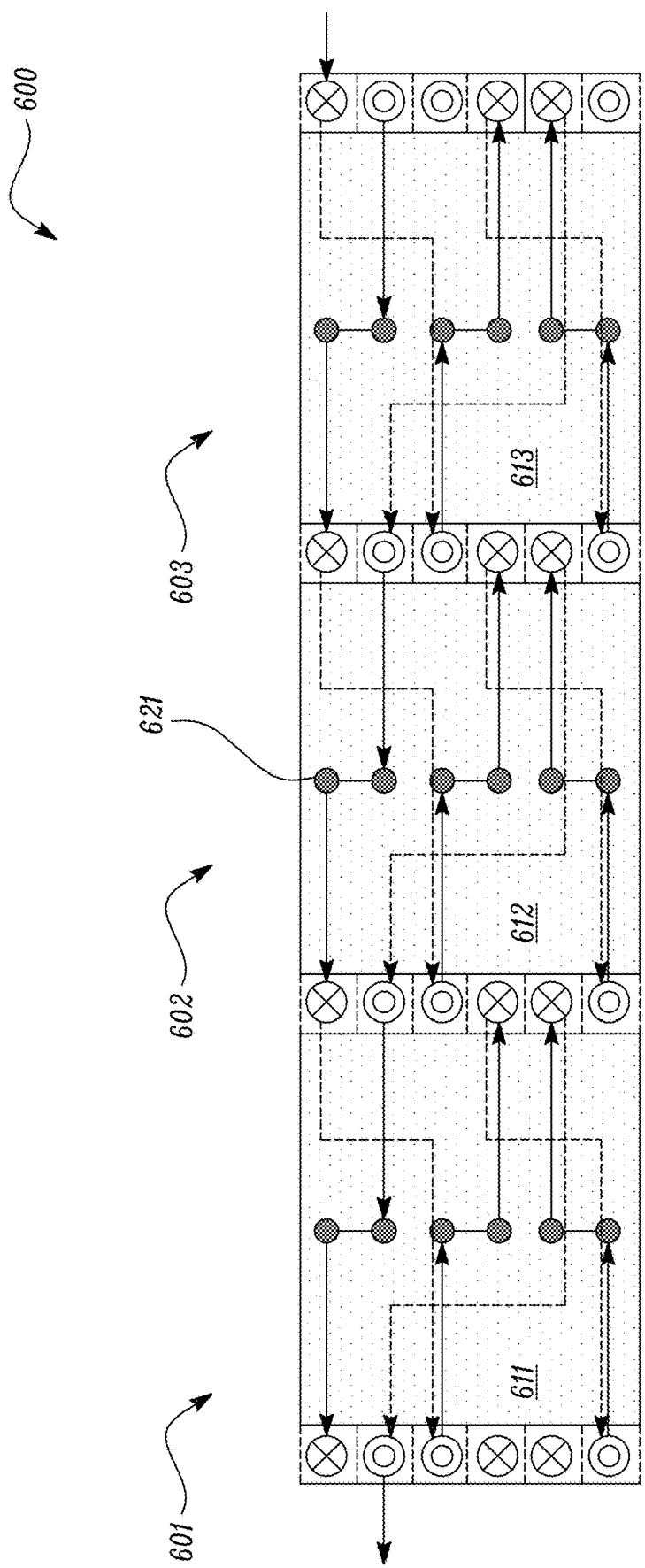
FIG. 6 is a schematic linearized representation of a portion of a stator for an electrical machine having a plurality of coils.

In each example, a further portion of a turn is provided once the coil is interleaved with other coils around adjacent teeth, making the total number of full turns n+1 once fully assembled, as can be seen in FIG. 6.

Figure 5B:
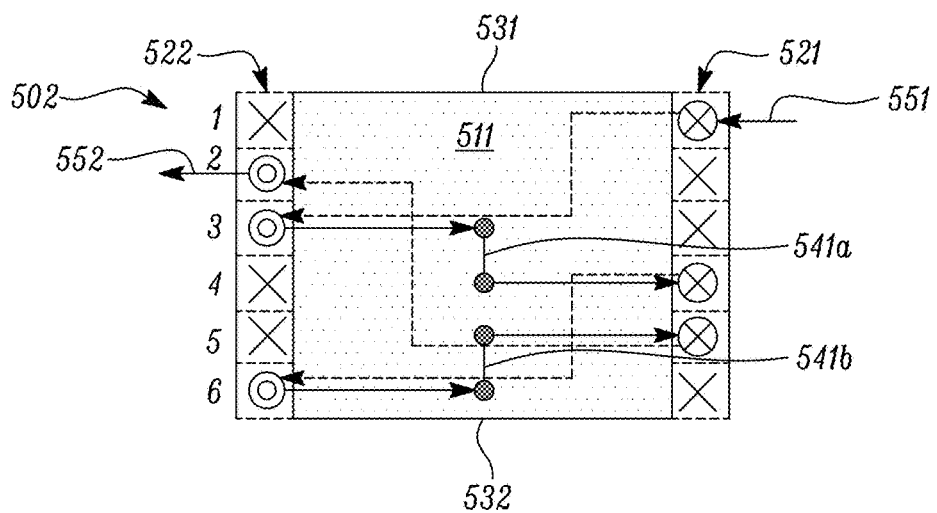
FIG. 5b is a schematic side view of an example winding arrangement of a coil with two full turns.
Figure 5C:
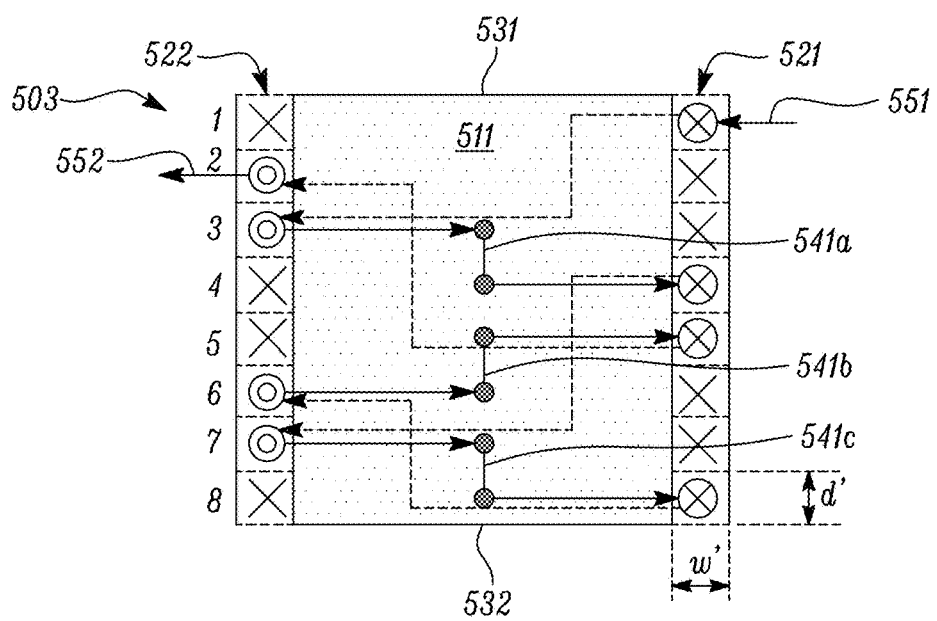
FIG. 5c is a schematic side view of an example winding arrangement of a coil with three full turns.
Figure 5D:
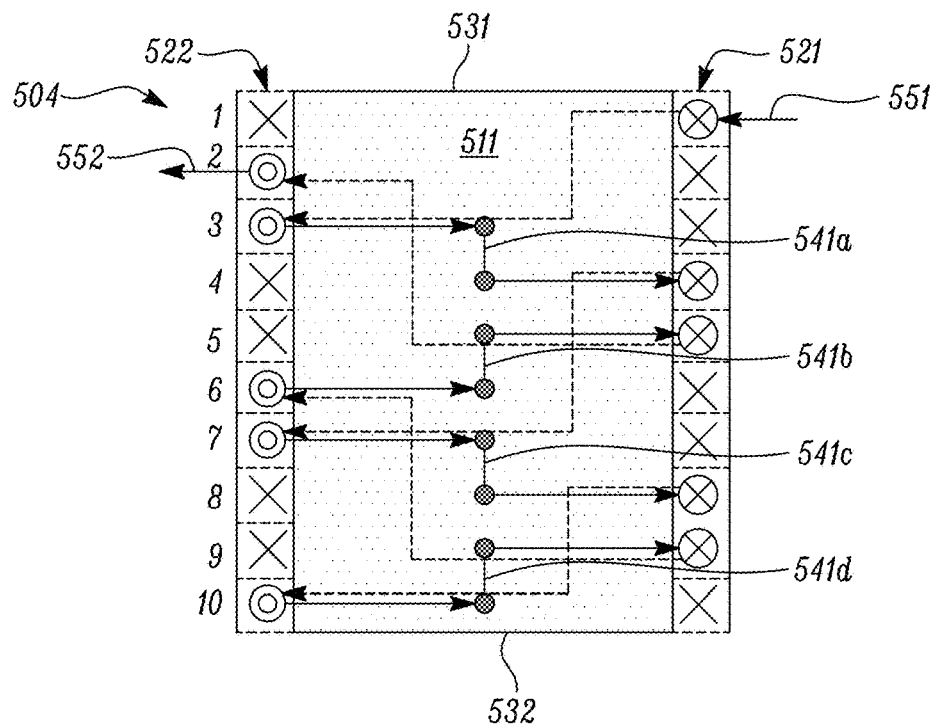
FIG. 5d is a schematic side view of an example winding arrangement of a coil with four full turns.
Figure 5E:
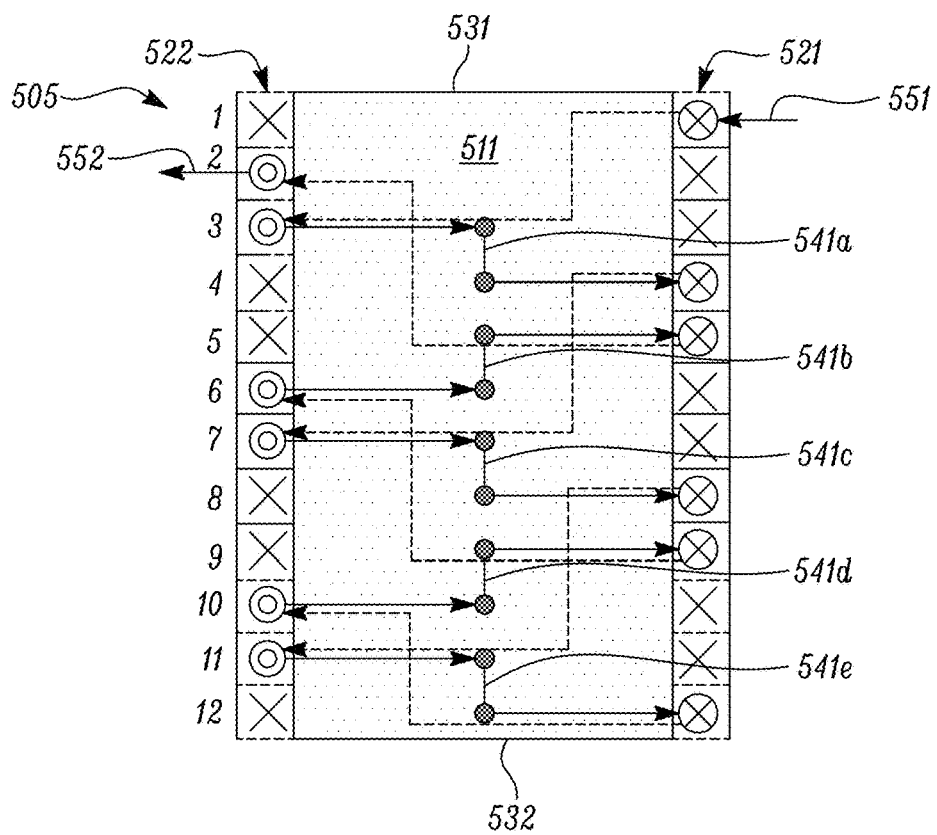
FIG. 5e is a schematic side view of an example winding arrangement of a coil with five full turns.

FIG. 6 illustrates in schematic form a portion of a stator 600 having a plurality of coils, showing three coils 601, 602, 603 of the type shown in FIG. 5b, i.e. with n=2, with windings around adjacent teeth 611, 612, 613 being interwoven so that all available slot positions are filled. Coil 601 around a first tooth 611 is connected to coil 603 around a third tooth 613 with a connection 621 across a second tooth 612. This connection 621 provides a further portion of a turn for coil 602, making the coil 602 consist of three full turns once all the coils are assembled. This pattern may be repeated around the stator of an electrical machine, so that coils around alternate teeth, or groups of teeth, are connected in series, allowing for terminal connections to be made on the outer radius of the stator 600. In practice, coils 601, 602, 603 will be curved to form an annular structure, the schematic representation in FIG. 6 being a simplified linearized representation of only a portion.

Figure 7:
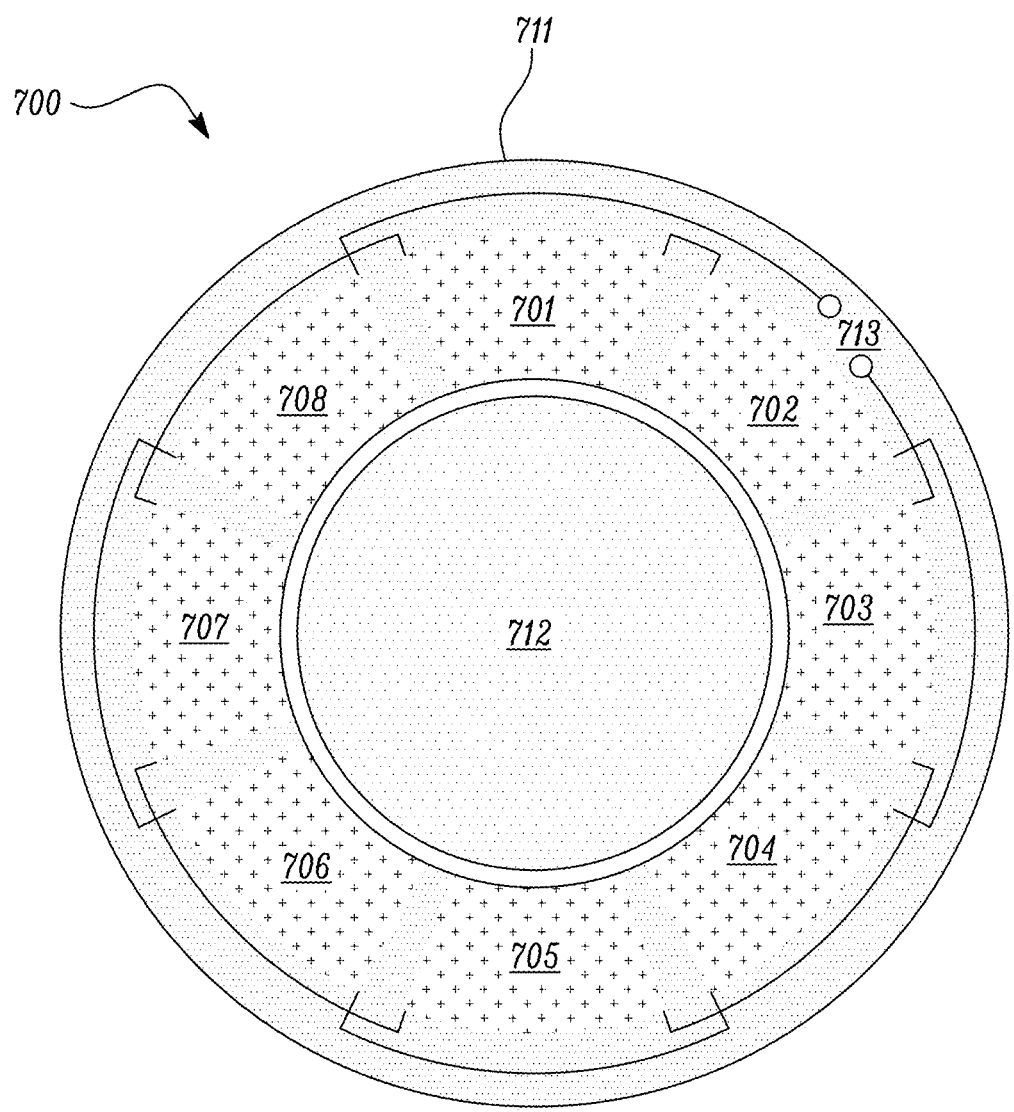
FIG. 7 is a schematic axial view of an example electrical machine.

The form of alternate coils illustrated in FIG. 6 results in coils around alternate teeth, or sets of teeth, being connected in series. An example electrical machine 700, comprising a stator 711 and a rotor 712 is illustrated schematically in FIG. 7. The stator 711 has an arrangement of coils 701-708 as described above in relation to FIG. 6, i.e. with alternate teeth, or sets of teeth, being connected in series. In alternative arrangements some or all of the coils 701-708 may be connected in parallel. The number of coils may be greater or fewer than in FIG. 7, which shows a total of eight coils to illustrate the general principle. A first set of coils is formed from coil 702 connected in series sequentially with coils 704, 706 and 708. A second set of coils is formed from coil 703 connected in series sequentially with coils 705, 707 and 701. The two sets of coils are connected in series, and terminal connections 713 provide connections for providing current to, or drawing current from, the coils. As can be seen, all of the connections are provided on the outer radius of the stator 711, which enables connections to be more easily accessed and allowing connections between coils to be more simply made.

In each of the described above, each tooth element may comprise more than one tooth, for example to allow for multiple phases in an electrical machine. References to a tooth or tooth element may therefore encompass one or more teeth, depending on whether the coil is part of a single or multiple phase electrical machine. For multiple phase electrical machines, the number of teeth in each tooth element may typically be three for a three-phase electrical machine.

It will be appreciated that in the above description, the coils 300, 501-505, 601-603 and stators 600, 711 have been described with respect to a radial flux machine. However, the coils could be used in the stator of an axial flux electrical machine, in which the direction of the magnetic flux produced by the permanent magnets of the rotor and cut during of rotation of the rotor is aligned with the rotation axis of the machine. In such a case, the direction of winding around the stator teeth would be such that the first slot position and $2n+2^{th}$ slot position will be at the same radial position, but at opposite axial ends of the stator.

It will be understood that the invention is not limited to the embodiments above-described and various modifications and improvements can be made without departing from the concepts herein. Except where mutually exclusive, any of the features may be employed separately or in combination with any other features and the disclosure extends to and includes all combinations and sub-combinations of one or more features described herein.

The invention claimed is:

1. A coil for a tooth element of an electrical machine stator, the coil comprising:
a plurality of hairpin wires having pairs of legs passing through first and second slots on opposing radially extending faces of the tooth element, the coil having n full turns passing around the tooth element, the first and second slots each having $2n+2$ slot positions having a depth for accommodating a single hairpin wire, the slots each having a first slot position at a radially outer end of the slot, a $2n+2^{th}$ slot position at a radially inner end of the slot and 2n slot positions radially between the first slot position and the $2n+2^{th}$ slot position, the coil having a first terminal connection connected to the hairpin wire extending through the first slot at the first slot position and a second terminal connection connected to the hairpin wire extending through the second slot at a second slot position, the second slot position being radially next to the first slot position.

2. The coil of claim 1, wherein the coil includes n+1 hairpin wires, with n electrical connections between legs of adjacent pairs of hairpins across the first axial face of the stator.

3. The coil of claim 1, wherein half of the slot positions in each slot are filled with a wire of the winding.

4. A stator of an electrical machine, comprising a plurality of tooth elements separated by a plurality of slots, each tooth element surrounded by a respective coil according to claim 1.

5. The stator of claim 4, wherein each slot position has a width w' for accommodating more than one hairpin wire.

6. The stator of claim 4, wherein coils around alternate tooth elements are connected in series.

7. The stator of claim 4, wherein each tooth element comprises a plurality of teeth.

8. An electrical machine comprising a rotor and a stator according to claim 4.

9. An aircraft propulsion system comprising an electrical machine according to claim 8.

* * * * *